United States Patent [19]

Posch

[11] Patent Number: 5,526,636
[45] Date of Patent: Jun. 18, 1996

[54] VACUUM MOWER WITH A DEVICE FOR CREATING A SUCTION AIR STREAM

[76] Inventor: Leopold Posch, Renneradorf 48, A-3200 Obergrafendorf, Austria

[21] Appl. No.: 260,188

[22] Filed: Jun. 15, 1994

Related U.S. Application Data

[63] Continuation-in-part of PCT/EP02923, Dec. 16, 1992.
[51] Int. Cl.⁶ .............................. A01D 34/50; A01D 34/84
[52] U.S. Cl. .............................. 56/12.9; 56/169.9; 56/256
[58] Field of Search ................................. 56/12.9, 13.1, 56/13.2, 13.3, 13.4, 256, 16.9, 17.1

[56] References Cited

U.S. PATENT DOCUMENTS 3,530,653  9/1970  Ott ................................................ 56/17.1
4,121,406  10/1978  Quintel ....................................... 56/256 X
5,020,309  6/1991  Hopkins ....................................... 56/13.3

FOREIGN PATENT DOCUMENTS 2626201  12/1977  Germany.
2643604  2/1978  Germany.

*Primary Examiner*—David J. Bagnell

[57] ABSTRACT

Vacuum mower with a device to create a suction air stream for sucking blades of grass (14) into an intake opening (16). The intake opening (16) can be applied at an angle of up to 80 degrees to the direction of the growth of the grass blades which creates a deep reaching effect of the vacuum so that grass can be effectively sucked in and cut especially close to walls, trees, roadside posts (1), etc. The invention can be used by itself or as an attachment to conventional lawn mowers.

18 Claims, 2 Drawing Sheets

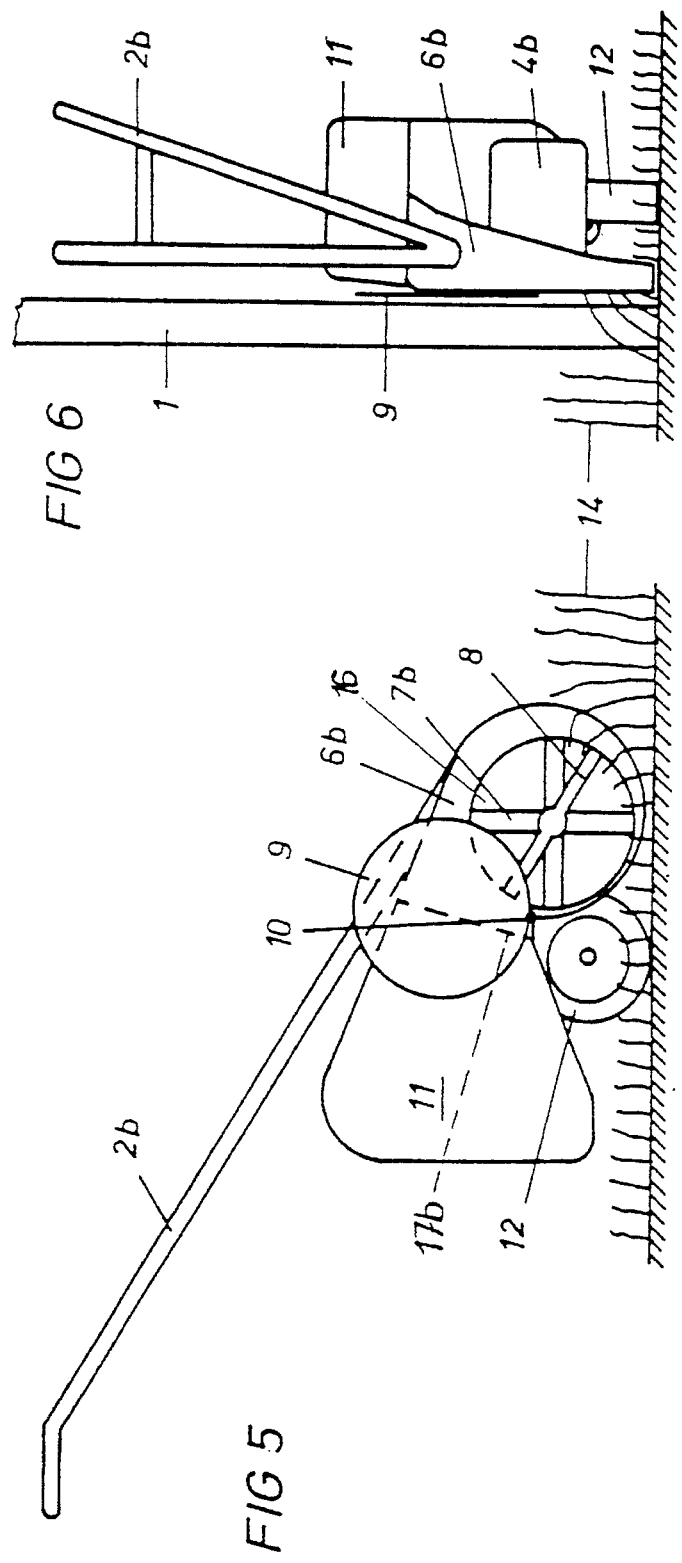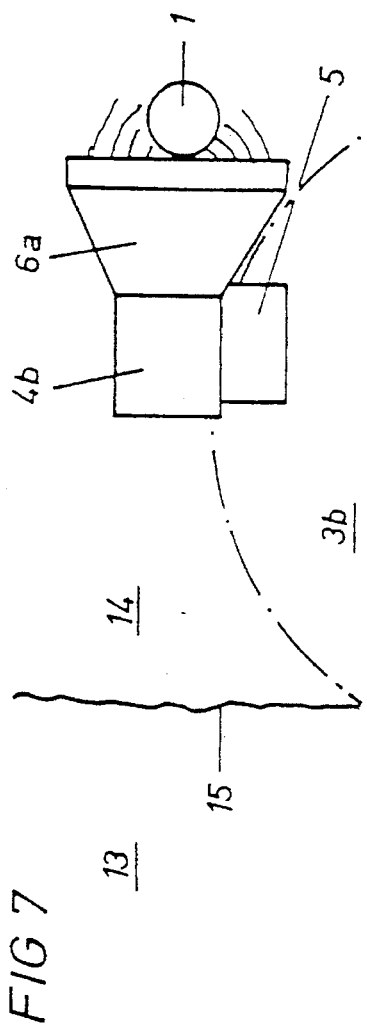

VACUUM MOWER WITH A DEVICE FOR CREATING A SUCTION AIR STREAM

This is a Continuation in Part of PCT/EP92/02923 Dec. 16, 1992, of the same inventor.

BACKGROUND OF THE INVENTION

This invention concerns a vacuum mower. By vacuum mower are understood all grass mowing devices that use an air stream, in whichever way, to support the mowing process. Vacuum mowers are conventional mowing devices, as e.g. the ones in DE B1 2643604. DE B1 2643604 shows a suction tube with an opening for the intake as well as one for the exhaust with a suction/blowing device which is able to suck the grass into the casing. According to DE B1 2643604 the device, contrary to other conventional mowers with rotating blades that operate parallel to the ground as, for example the U.S. Pat. No. 4,718,221, has the advantage that the angle between the opening for the intake and the direction of the growth of the grass can be altered. The mowing device for cutting the stems of the grass may be placed in front of the opening for the intake in the shape of a chaff cutting cylinder within a suction bell (column 1, lines 60–64), but it may also be built into the device directly at the intake in the form of a nozzle sucking up the grass (column 3, lines 63–64).

Chaff cutting cylinders are unshapely cylinders with a large number of cutting blades which are used only for a special mowing process of large areas. Their drives though, are heavy and cylinders serve for cutting the grass into small pieces rather than for cutting it off neatly. Placing the cutting device at one end of the suction tube while the other is mounted on a vehicle held above the ground by wheels, regardless of the contour of the ground below the cutting device, makes the construction somewhat difficult if you want to cut the grass at always the same height above the ground. The suction tube is rarely used for cutting grass on uneven terrain because it was mainly constructed for cutting bushes and shrubs at the side of the road, respectively for cutting grass on ground sloping down to the road. Such known devices are less suitable for universal use in gardens, parks or, for example golf courses.

SUMMARY OF THE INVENTION

The main purpose of the invention is to devise a simple vacuum mower for universal use that can mow grass at an angle to the vertical as can chaff cutting cylinders, so that, for example, also the edges of an even meadow that do not lie directly below the mower can be trimmed, the mower following by itself the contour of the ground below.

This task is essentially achieved by combining the following.

A device for always maintaining the same distance from the ground (e.g. in accordance with U.S. Pat. No. 5,020,309)

Placing the intake opening at an angle (as in DE B1 2643604) and

Use of a device creating a vacuum strong enough to bend and suck grass from around the intake opening into the casing so that it may be cut there.

The invention may be used independently or in combination with conventional lawn mowers, particularly to remove grass from the areas next to stable obstacles in the best way possible. Because of this, trimming these areas by hand or with handheld cutting devices after the use of the mower can become unnecessary.

This also has the special advantage of approaching the grass that has to be cut from the side without directly touching it. With this invention the grass, so to speak, moves towards the mowing device whereas with the conventional lawn mowers, as for example according to U.S. Pat. No. 4,718,221, the mowing device has to be moved towards the grass, respectively must be put on top of it. A further result is a relatively low wear of the mowing equipment, but in particular a protection of bushes, bark of trees, facades, etc. because these will come in contact with only the vacuum stream during the mowing procedure and will not automatically be engaged and cut or at least damaged as is the case with conventional chaff cutting devices.

By preferrential design of the cutting tool, either the vacuum generator or a separate drive for the cutting tool can be omitted.

Though with some conventional lawn mowers attachments resembling ventilators are known to exist, these serve to collect the cut grass for example in a bag or to maintain a steady distance from the ground without using a wheel, by creating a sort of an air cushion. The sucking in of the grass at an angle different from the direction of the growth of the grass as is the case in the concept according to DE B1 2643604 however is impossible.

The lawn mower described in U.S. Pat. No. 5,020,309 also has an additional ventilator in the grass discharge conduit in order to discharge cut blades of grass from the mower and to perhaps shred them. This mower can follow contours of the ground well, due to its wheels, but cannot cut grass at the edges or around trees, next to walls, etc. in a satisfactory manner because this grass—as with all other conventional mowers—is not grabbed and therefore not cut either. For the grass growing in such spots, special cutting devices such as weed eaters, trimmers and hedgers have been designed, which will be rendered obsolete by this invention.

Thus conventional lawn mowers, with blades that create an air stream, differ only slightly from other lawn mowers—at least in regard to their capability to engage and grab blades of grass etc. close to walls, tree trunks, roots, bushes, fences, poles along roads, etc. For cutting off of grass close to such more or less stable obstacles, conventional lawn mowers (with the exception of motor scythes) can hardly be used. For one wheels, protective parts and other parts of the frame of the lawn mower are not allowed to get close to said obstacles and, in addition mowing around posts along the side of roads is often cumbersome and impeded by buildings.

In these cases the suction effect of conventional lawn mowers is practically useless because the area where they can effectively be used is hardly larger than the one lying directly under the mower.

The different ways of using the invention have the following advantages:

At an angle of application of not more than 80 degrees, the suction power reaches beyond the area of the lawn mower proper and may suck in and cut off for example small grass blades, bushes, etc. in a direction about parallel to the ground. By standard direction of growth essentially a vertical direction to the ground is understood. Above all, longer blades of grass whose stem is relatively thick close to the ground are caught by the invention at the top where they can still be easily bent, and be pulled into the lawn mower where they are cut off.

The smaller the angle of application, the closer it is to 0 degrees, the stronger is the vertical effect on the ground with the lawn mower of this invention. So, for example even grass blades around a roadside pole can at the same time be pulled in by the vacuum stream and be cut off. Mowing around such a pole thus is not necessary. Practical application shows that the resulting small differences in the length of the cut stems of grass are tolerable.

Mounting the invention on a conventional lawn mower results in an advantageous combination with which grass can be successfully cut wherever it may grow. In addition, it is possible to pick up leaves, etc. as with a vacuum cleaner for which purpose a detachable suction bell may be provided.

The exact spot where on a conventional lawn mower the invention may be mounted can be freely chosen. One may paritcularly choose to place it between the front or the back wheels. The invention may also be completely integrated into the casing of the lawn mower. In that case, placing it in the area of the felloe of the wheels provides a particularly elegant and compact solution.

Mounting the invention on a cutting device with open blades results in an even more flexible use in the niches in walls, etc. in which case especially the suction effect turns out to be an asset in supporting the mowing process.

The use of a tubular casing complies with the rules of the use of rotating blades and devices for the creation of an air stream (e.g. ventilator blades). In that case the discharge opening is designed so that on the one hand the cut off grass is discharged in the best way possible and on the other hand there is no contact with rotating parts on the discharge side of the machine.

Of course other blades or air stream creating devices as, for example the radial cylindric blower type, lie within the scope of the invention.

A device to protect direct touch of the intake opening prevents the intake of stronger bushes which are not meant to be cut, as well as injuries of hands or pets.

The variant with a friction clutch increases the safety of the device and prevents the killing of the respective motor.

The design in one piece is very compact and has only few individual parts. The adjustable cover of the intake opening makes it possible to regulate the power of the air stream and protects the rotating blades.

The one embodiment is a design without a separate motor for the cutting device and at the same time has a friction clutch effect at the cutting part. There the cutting apparatus has to be in relative proportion with the diameter of the suction tube as well as with the force of the air stream. This solution provides the advantage of separating the motor generating the air stream from the area where the grass is cut. Placing this mowing device in the suction nozzle in accordance with DE B1 would be feasible.

BRIEF DESCRIPTION OF THE DRAWINGS

The invention is further explained by the enclosed drawings, which show in

FIGS. 5 and 6 a device for mowing edges of roads; and

FIG. 7 a detail of the attachement of the invention to a conventional lawn mower being used to mow around a roadside post.

DETAILED DESCRIPTION OF PREFERRED EMBODIMENTS

Figure 2:
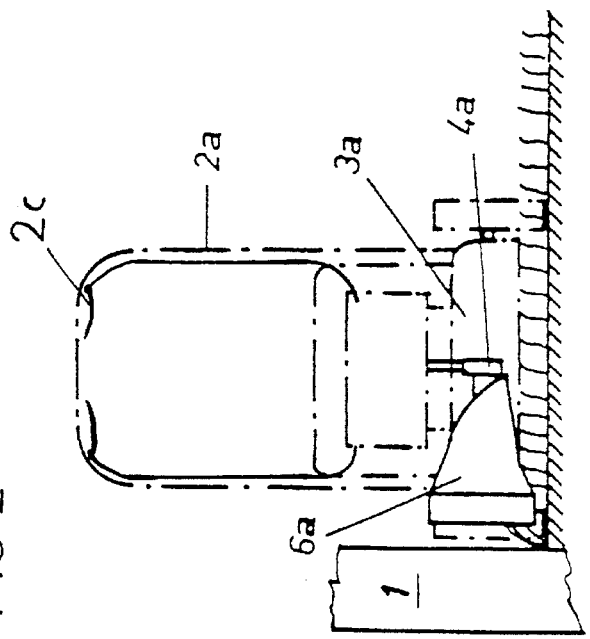
FIGS. 1 and 2 the invention attached to a conventional lawn mower.
Figure 4:
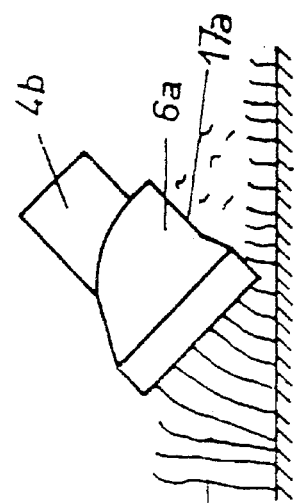
FIGS. 3 and 4 a suction mower (vacuum mower) using the invention as may be the case with motor scythes.

The drawings are described in context and in an overall way. Same parts are marked by same symbols, similar parts show same symbols but are indexed differently.

The invention is best used for the mowing of grass along walls and fences and around trees, bushes, roadside posts 1 etc. By obliquely adjusting the intake opening 16 (FIG. 3) grass 14 is pulled vertically into the intake opening 16 and is cut there by a cutting device 7a. A casing 6a built around the cutting device 7a is designed for either the axial discharge of the grass (6a according to FIGS. 1–4 and 7) or for the radial discharge of the grass (6b according to FIGS. 5 and 6). Attaching a vacuum mower as in the invention to a conventional lawn mower 3a (FIGS. 1 and 2) is best used for mowing larger areas and only in second place in removing grass 14 close to walls 1. In that case a conventional lawn mower 3a is slid or pushed—as usual—over the mower by means of a sliding guide 2a. Hand lever safety means 2c are released when the lawn mower 3a is not being pushed with both hands, thus stopping the movement of the lawn mower.

The casing 6a is mounted in such a manner that the intake opening 16 can be positioned close to the wall 1. Mounting is by fitting 5 which is adjustable and slides into desired position so that the mower can be adjusted as conditions may require.

By such a fitting, particularly 5, the angle of the intake opening too may be adjusted.

Figure 1:
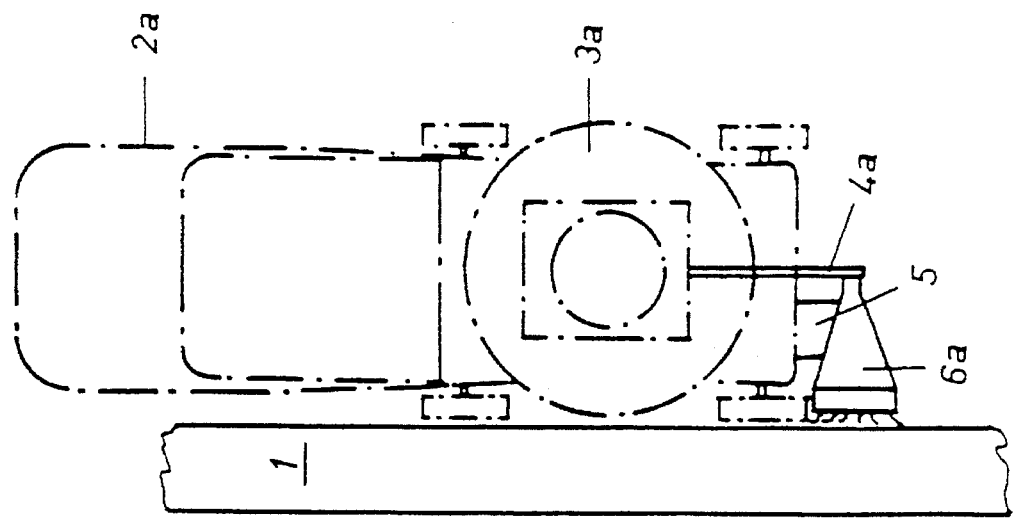

In the case of FIGS. 1 and 2 the power from the motor of the conventional lawn mower 3a is transmitted to the vacuum mower as in the invention by a belt or a flexible shaft 4a. In the other cases, the power is generated by a motor 4b driven by combustion, electrically or hydraulically or by a vacuum air current, etc.

Figure 3:
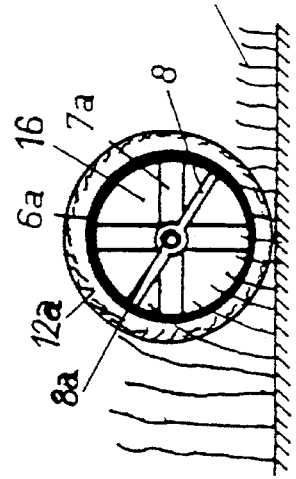

The intake opening 16 is protected against direct contact by a protective grill 8, so that voluminous objects can be kept away from the cutting device. Referring to FIG. 3, the cutting device, blade 7a is arranged to rotate freely on a bearing 8a in the protective grill 8.

The type in FIGS. 5 and 6 is a special design for mowing close to road edges, walls, fences, etc. There the discharge opening 17b goes into a bagging device 11 or into a basket. Through a removable covering 9 the diameter of the intake opening 16 can be varied in order to regulate the suction power. The intake opening may be rotated around a rotation point 10. Within the frame of the invention lie also other types of covers such as sliding metal plates, etc.

The type for mowing road edges 3b can be pushed on wheels 12, the height of which is adjustable. It can be directed by push bars 2b.

The type according to FIG. 7 shows the assembly of a lawn mower with the vacuum mower attached according to the invention for mowing relatively large areas 14 at the edges of roads 15 respectively next to the road surface itself 13. Contrary to the type as according to FIGS. 1 and 2 such a vacuum mower has its own, for example hydraulic motor 4b which, for example allows for the regulation of the vacuum power by the speed of rotation. Such devices are, for example frequently mounted on communal riding mowers. The fixing 5 may, for example be adjusted or hydraulically turned along the arc marked by points and dashes around the lawn mower 3b. By doing this all possible special situations at a given edge of a road can be met. An elegant solution can be seen in FIG. 3 where the intake opening has been integrated in a wheel 12a.

Special safety devices to reduce the danger of injuries of the user, of animals, etc. respectively to protect the blades (in case of the use of an idling device) are not shown in the drawings but may be provided as described in the claims. The invention may also be used to its advantage as a blower or for collecting fallen leaves. In the first case a device for the reversion of the sense of rotation can be installed. If the discharge opening of the case of the cutting device leads to the mower deck of a lawn mower as shown in the drawing, there is the additional advantage of the grass being shredded once more and is at any rate taken through the mower to, for example a bagging device or grass collection basket.

List of Symbols

1. Wall, tree, bush, garden fence, roadside posts
2a. Guiderail to mount mower
2b. Push bars
3a. Lawn mower or similar device
3b. Device for mowing road edges
4a. Transmission by belt, flexible shaft, etc.
5. Fixing (adjustable or sliding in all directions)
6a. Casing for axial discharge
6b. Casing for radial discharge
7a. Ventilator (blades) including cutting device for axial discharge
7b. Ventilator (blades) including cutting device for radial discharge
8. Protection grill
9. Adjustable cover (for less suction or greater safety)
10. Pivot for cover
11. Collection bag or basket
12, 12a. One or several wheels the height of which can be adjusted
13. Road surface
14. Grass
15. Road edge
16. Intake (opening)
17a, b. Discharge (opening)

I claim:

1. A vacuum mower comprising:

a case, generating means for generating an air stream for transporting cut-off blades of grass within said mower, an intake opening, at least one cutting device immediately behind said intake opening for cutting-off blades of grass, said cutting device having at least one blade, and distance holding means for maintaining a minimum distance between said intake opening and ground, so that in an operating position of said mower, said intake opening is arranged to follow a contour of the ground, wherein a plane defined by said intake opening in said operating position of said vacuum mower forms a small angle with said ground, and said means for generating an air stream has a power adequate to bend un-cut grass blades in and around said intake opening into said intake opening for cutting by said cutting device.

2. A vacuum mower according to claim 1, further comprising operating means for mechanically operating said blade so that said blade comprises said means for generating an air stream.

3. A vacuum mower according to claim 1, wherein said means for generating an air stream creates a vacuum, said case comprises a tubular case, and said blade is arranged to rotate freely on a bearing to be driven by said air stream.

4. A vacuum mower according to claim 1, wherein said plane defined by said intake opening forms an angle of less than 20 degrees, with normal direction of grass blade growth.

5. A vacuum mower according to claim 1, further comprising means for varying said angle of said intake opening with normal direction of grass blade growth.

6. A vacuum mower according to claim 1, further comprising means for attaching said cutting device to a conventional motor mower.

7. A vacuum mower according to claim 6, further comprising drive means for producing a vacuum air stream by a motor of said conventional motor mower.

8. A vacuum mower according to claim 7, wherein said drive means comprises a belt or flexible shaft.

9. A vacuum mower according to claim 1, wherein said blade rotates in said case and comprises a freely movable cutter blade.

10. A vacuum mower according to claim 1, further comprising a grass collecting container and a discharge opening opposite said intake opening that, in operation, is oriented towards at least one of said grass collecting container, a case of a lawn mower, and ground.

11. A vacuum mower according to claim 1, further comprising an adjustable cover arranged over said intake opening.

12. A vacuum mower according to claim 11, further comprising closing means for closing said adjustable cover completely.

13. A vacuum mower according to claim 1, further comprising rods or grill means for protecting said intake opening.

14. A vacuum mower according to claim 1, wherein said distance holding means comprises front and back wheels, and said intake opening is placed in an area of said front or back wheels.

15. A vacuum mower according to claim 1, wherein said casing has a spiral shape.

16. A vacuum mower according to claim 1, further comprising a motor for powering said cutting device and safety means connected to said motor for stopping a lawn mower to which said vacuum mower is attached when said lawn mower is not being pushed with both hands.

17. A vacuum mower comprising:

a case, generating means for generating an air stream for transporting cut-off blades of grass within said mower, an intake opening, at least one cutting device immediately behind said intake opening for cutting-off blades of grass, said cutting device having at least one blade, and distance holding means for maintaining a minimum distance between said intake opening and ground, so that in an operating position of said mower, said intake opening is arranged to follow a contour of the ground, wherein a plane defined by said intake opening in said operating position of said vacuum mower forms an angle of less than 80 degrees with normal direction of growth of grass blades, said means for generating an air stream has a power adequate to bend un-cut grass blades in and around said intake opening into said intake opening for cutting by said cutting device, and said means for generating an air stream and said cutting device are arranged so that said airstream is axial with respect to an axis of said cutting device.

18. A vacuum mower comprising:

a case, generating means for generating an air stream for transporting cut-off blades of grass within said mower, an intake opening, at least one cutting device immediately behind said intake opening for cutting-off blades of grass, said cutting device having at least one blade, and distance holding means for maintaining a minimum distance between said intake opening and ground, so that in an operating position of said mower, said intake opening is arranged to follow a contour of the ground, wherein a plane defined by said intake opening in said operating position of said vacuum mower forms an angle of less than 80 degrees with normal direction of growth of grass blades, said means for generating an air stream has a power adequate to bend un-cut grass blades in and around said intake opening into said intake opening for cutting by said cutting device, and said means for generating an air stream creates a vacuum, said case comprises a tubular case, and said blade is arranged to rotate freely on a bearing to be driven by said air stream.

* * * * *